US007375828B1

(12) United States Patent
Aoyagi et al.

(10) Patent No.: US 7,375,828 B1
(45) Date of Patent: May 20, 2008

(54) MODAL METHOD MODELING OF BINARY GRATINGS WITH IMPROVED EIGENVALUE COMPUTATION

(75) Inventors: Paul Aoyagi, Sunnyvale, CA (US); Leonid Poslavsky, Belmont, CA (US)

(73) Assignee: KLA-Tencor Corporation, San Jose, CA (US)

( * ) Notice: Subject to any disclaimer, the term of this patent is extended or adjusted under 35 U.S.C. 154(b) by 413 days.

(21) Appl. No.: 11/137,165

(22) Filed: May 25, 2005

(51) Int. Cl.
*G01B 11/28* (2006.01)
(52) U.S. Cl. ...................... 356/625; 356/630; 702/155; 702/170
(58) Field of Classification Search ................ 356/625, 356/630; 702/155, 170, 28
See application file for complete search history.

(56) References Cited

U.S. PATENT DOCUMENTS

| | | | | |
|---|---|---|---|---|
| 5,420,803 | A * | 5/1995 | Judell | 702/170 |
| 6,891,626 | B2 * | 5/2005 | Niu et al. | 356/625 |
| 6,952,271 | B2 * | 10/2005 | Niu et al. | 356/625 |
| 7,190,453 | B1 * | 3/2007 | Aoyagi et al. | 356/369 |

OTHER PUBLICATIONS

Moharam et al., "formulation for stable and efficient implementation of the rigorous coupled-wave analysis of binary gratings," J. Opt. Soc. Am. A, vol. 12, No. 5, May 1995.

Botten et al., "The dielectric lamellar diffraction grating," Optica Acta, 1981, vol. 28, No. 3, pp. 413-428.

Li, "A modal analysis of lamellar diffraction gratings in conical mountings," Journal of Modern Optics, 1993, vol. 40, No. 4, pp. 553-573.

Tayeb et al., "On the numerical study of deep conducting lamellar diffraction gratings," Optica Acta, 1984, vol. 31, No. 12, pp. 413-428.

* cited by examiner

*Primary Examiner*—L. G Lauchman
(74) *Attorney, Agent, or Firm*—Luedeka, Neely & Graham, P.C.

(57) ABSTRACT

A method of determining actual properties of layered media. An incident beam of light is directed towards the layered media, such that the incident beam of light is reflected from the layered media as a reflected beam of light. The actual properties of the reflected beam of light are measured, and properties of the layered media are estimated. A mathematical model of the layered media based on a modal function expansion is solved with the estimated properties of the layered media to yield theoretical properties of the reflected beam of light. The eigenvalues of the modal functions are computed recursively by recasting the eigenvalue equation in the following form:

$$\beta_n^{i+1} = F(\beta_n^i)$$

where $\beta_n^i$=the eigenvalue of the $i^{th}$ recursion and F is a function such that $\beta_n = F(\beta_n)$ is mathematically identical to the eigenvalue equation.

14 Claims, 1 Drawing Sheet

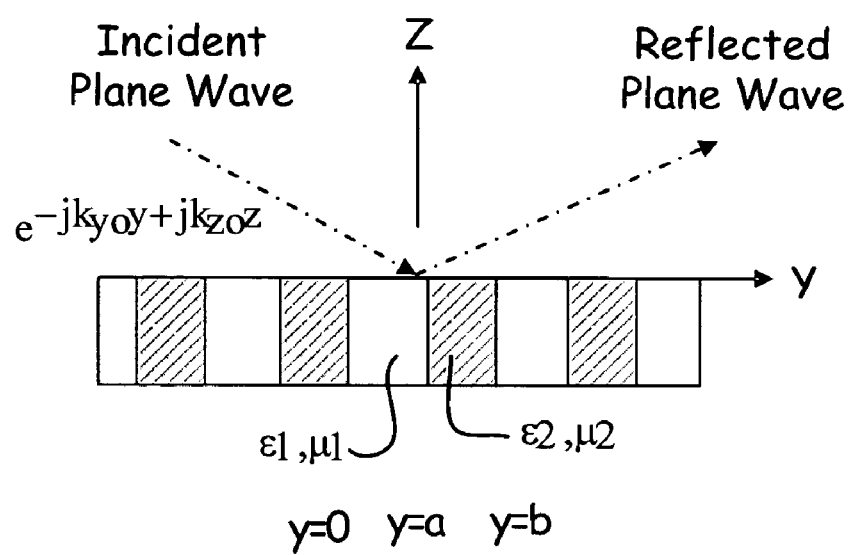

MODAL METHOD MODELING OF BINARY GRATINGS WITH IMPROVED EIGENVALUE COMPUTATION

FIELD

This invention relates to the field of film measurement. More particularly, this invention relates to a system for improving the speed and accuracy of multi layered film stack thickness measurement and other property measurement, such as in the integrated circuit fabrication industry.

BACKGROUND

As the term is used herein, "integrated circuit" includes devices such as those formed on monolithic semiconducting substrates, such as those formed of group IV materials like silicon or germanium, or group III-V compounds like gallium arsenide, or mixtures of such materials. The term includes all types of devices formed, such as memory and logic, and all designs of such devices, such as MOS and bipolar. The term also comprehends applications such as flat panel displays, solar cells, and charge coupled devices.

Integrated circuits are formed of many layers of different materials, which layers are patterned so as to form desired structures that interact with one another according to predetermined designs. Thus, it is of vital importance that many of these layers be formed to very exacting tolerances, such as in their shape, thickness, and composition. If the various structures so formed during the integrated circuit fabrication process are not precisely formed, then the integrated circuit tends to not function in the intended manner, and may not function at all.

Because the layers of which integrated circuits are formed are so thin and patterned to be so small, they cannot be inspected without the aid of instrumentation. The precision of the instrumentation used is, therefore, vital to the successful production of integrated circuits. Thus, any improvement that can be made in the accuracy of such instrumentation is a boon to the integrated circuit fabrication industry. In addition, any improvement in the speed at which such instrumentation can take its readings is also of benefit to the industry, as such speed enhancements tend to reduce the production bottlenecks at inspection steps, or alternately allow for the inspection of a greater number of integrated circuits at such inspection steps.

Spectral ellipsometers and dual beam spectrophotometers are typically used to measure properties such as thickness and refractive index of individual layers within a multilayered film stack. Such instruments work by directing one or more beams of light toward the surface of the film stack, and then sensing the properties of the light as it is variously reflected off of the different surfaces of the individual layers within the film stack. By adjusting the properties of the incident beam of light, and detecting the associated changes in the reflected beam of light, the properties of the film stack, such as the materials of which the various layers are formed and the thicknesses to which they are formed, can be determined. Such methods typically involve solving Maxwell's equations, which provide a model for such systems.

This film measurement process can be broken down into two basic steps, being 1) the measurement of the properties of the reflected light beam, and 2) the mathematical fitting of reflectance property values from Maxwell's equations, which are solved or estimated, to the measured results attained in step 1. Step 2 typically consists of the iterated steps of computing one or more theoretical value by plugging estimates of the film stack parameters, such as thickness and refractive index, into the model film stack equations, comparing the theoretical values obtained to the actual measured property values of the reflected beam of light, and if the theoretical values and the measured values do not agree to within a desired tolerance, then adjusting the estimated film stack parameters and recomputing the theoretical values.

This process is performed again and again, each time making some adjustment to the estimated film stack parameters that are fed into the model, until the theoretical values computed by the model agree with the actual measured values within the desired precision limits. When this agreement is attained, then there is some confidence that the estimated film stack parameters that were used to produce the theoretical values are very nearly the same as the actual film stack parameters.

For film stacks containing non-isotropic, inhomogeneous layers, such as layers containing metal patterns or gratings, the theoretical values are commonly generated by mathematical models based on either the rigorous coupled wave analysis or modal method.

In general, the modal method formulation has the potential to be more accurate than the rigorous coupled wave analysis formulation, because exact analytical expressions for the modes are used rather than spectral approximations for these modes. Other disadvantages of the rigorous coupled wave analysis method are 1) reduced measurement throughput caused by intensive matrix eigenvalue/eigenvector computation, and 2) empirically poor accuracy in the long wavelength regime. However, while there are some benefits to using a modal method, it is only used in very rare instances because it is notoriously difficult to determine the eigenvalues that mathematically characterize the modes.

What is needed, therefore, is a spectral film stack measurement based on a modal method with an improved eigenvalue computation scheme that tends to reduce, at least in part, problems such as those described above.

SUMMARY

The above and other needs are met by a method of determining actual properties of layered media. An incident beam of light is directed towards the layered media, such that the incident beam of light is reflected from the layered media as a reflected beam of light. The actual properties of the reflected beam of light are measured, and properties of the layered media are estimated. A mathematical model of the layered media based on a modal function expansion is solved with the estimated properties of the layered media to yield theoretical properties of the reflected beam of light. The eigenvalues of the modal functions are computed recursively by recasting the eigenvalue equation in the following form:

$$\beta_n^{i+1} = F(\beta_n^i)$$

where $\beta_n^i$=the eigenvalue of the $i^{th}$ recursion and F is a function such that $\beta_n = F(\beta_n)$ is mathematically identical to the eigenvalue equation.

With the aid of the recursive equation given above, exact eigenvalues can be robustly and reliably found. Using an approximation such as the rigorous coupled wave analysis method tends to yield a less exact solution.

In various embodiments, the method is implemented in an ellipsometer or a scatterometer. The layered media may be layers of more than one material or more than one layer. The layered media in some embodiments includes a grating layer. The actual properties of the layered media preferably include at least one of layer thickness and layer refractive index. In some embodiments the layered media is a film stack on a semiconducting substrate.

BRIEF DESCRIPTION OF THE DRAWING

Further advantages of the invention are apparent by reference to the detailed description when considered in conjunction with the FIGURE, which is not to scale so as to more clearly show the details, wherein like reference numbers indicate like elements, and which depicts a one-dimensional grating structure to be measured according to the methods described herein, such as a film stack on a semiconducting substrate.

DETAILED DESCRIPTION

The preferred embodiments of the present invention differ from the previous measurement techniques in that the RCWA method is replaced with the modal method. The modal method described herein reduces the computational time required as compared to RCWA methods, by reducing the 0(N') operations associated with the matrix equation based RCWP eigenvalue/eigenvector computation to 0(N) operations of the non-matrix modal method eigenvalue/eigenvector computation. This invention differs from previous modal method based techniques in that a new algorithm is used that computes more reliable and accurate eigenvalues of the characteristic electromagnetic field modes.

The method is accomplished by first rewriting the characteristic scalar-eigenvalue equations of the modal method into various recursive forms so that complex valued eigenvalues can be computed according to branch cuts in a function. Empirically, this enables a very robust and accurate computation of about eighty-five of the about one hundred eiyenvalues that are desired. Second, the computed elgenvalues are ordered in such a way as to identify missing eigenvalues. For example, relatively large gaps can be identified in the eigenvalue spectrum, wherein it can be assumed additional eigenvalues reside, which were not computed in the first step. Third, the missing eigenvalues are computed using a root finding scheme, such as a Newton-Raphson method. In this manner, all of the desired eigenvalues are discovered.

Relative to film measurements using matrix method reflectance computations, the preferred methods according to the present invention tend to reduce the computation time by up to a factor of about two. This reduction in the computational overhead can potentially be orders of magnitude greater in the low frequency regime where the number of RCWA modes must be increased to obtain acceptable accuracy. Relative to previous film measurements using the modal method, this invention improves the reliability and robustness of the measurement.

One unique feature of the invention is the method used to compute the eigenvalues of the modal method, which uses the inverse trigonometric functions that can be made to appear in the eigenvalue equation. One property of the inverse trigonometric functions is that they are multivalued. For example, Arctangent(x)=y+N*Pi, when N=0, 1, 2, and so forth. Each value of N is called a branch of the function. Solving down each branch of a multivalued function has traditionally required extreme resources. However, by limiting a eigenvalue search to a specific branch of N, called a branch cut, all the eigenvalues of the function can be found very systematically and robustly. This is explained in more detail below.

Derivation of Recursive Eigenvalue Computation

The modal method is a method of computing the fields generated by an electromagnetic plane wave or waves incident on multi-layered films containing one or two dimensional periodic structures, as exemplified in the FIGURE. These periodic structures are interchangeably referred to as gratings or patterns. The modal method is a standard approach based on expanding the fields inside each layer as a superposition of mathematical functions called modes, for example $\phi_n(r,t)$ where n=mode number, r=xx+yy+zz, and t equals time.

Each mode satisfies the Maxwell's equations and boundary conditions for that layer. From the linearity of Maxwell's equations in each layer, any and all field distributions given by $\phi(r)$ can be expressed exactly as an appropriately weighted superposition of these modes, such as:

$$\phi(r,t) = \sum_{n=-\infty}^{\infty} C_n \phi_n(r,t) \qquad 1$$

where $C_n$=weighting coefficient.

Typically, the weighting coefficients are computed by solving a deterministic set of linear equations that are derived from matching the tangential field components at each film layer interface.

For isotropic film layers, it is common practice to extract the time dependence using a Fourier transform and express these modes as time-harmonic plane waves, such as:

$$\phi(r) = \sum_{n=-\infty}^{\infty} C_n e^{-jk_n \cdot r} \qquad 2$$

where $k_n = k_{xn}x + k_{yn}y + k_{zn}z$ and $k_{xn}$, $k_{yn}$, $k_{zn}$ are complex numbers corresponding to the $n^{th}$ mode.

For the layers containing layers, the modes are considerably more complicated. As with the plane wave representation, a Fourier transform is used to simplify the time dependence to $e^{j\omega t}$. For the one-dimensional grating shown in the FIGURE, with a plane wave $e^{jk_{y0}y + jk_{z0}z}$ incident on the grating, the modes inside the grating are given by:

$$\phi_n(y,z) = \left( \frac{\psi_n(b)}{e^{jk_{y0}b} - \theta_n(b)} \theta_n(y) + \psi_n(y) \right) e^{jk_{zz}z} \qquad 3$$

where $$\theta_n = \begin{cases} \cos(\beta_n y) & 0 \le y \le a \\ \cos(\beta_n a)\cos(\gamma_n(y-a)) - \\ \frac{r_2}{r_1}\frac{\beta_n}{\gamma_n}\sin(\beta_n a)\sin(\gamma_n(y-a)) & a \le y \le b \end{cases} \qquad 4$$

-continued $$\psi_n = \begin{cases} \dfrac{1}{\beta_n}\sin(\beta_n y) & 0 \le y \le a \\ \dfrac{1}{\beta_n}\sin(\beta_n a)\cos(\gamma_n(y-a)) - \\ \quad \dfrac{r_2}{r_1}\dfrac{1}{\gamma_n}\cos(\beta_n a)\sin(\gamma_n(y-a)) & a \le y \le b \end{cases} \quad 5$$

$$r_m = \begin{cases} \varepsilon_m & \text{for } x-dir \text{ electric field} = 0 \; (TM \text{ fields}) \\ \mu_m & \text{for } x-dir \text{ magnetic field} = 0 \; (TE \text{ fields}) \end{cases} \quad 6$$

$$\gamma_n^2 = \beta_n^2 + \omega^2 \mu_2 \varepsilon_2 - \omega^2 \mu_1 \varepsilon_1 \quad 7$$

$$k_z^2 = \omega^2 \mu_1 \varepsilon_1 - \beta_n^2 \quad 8$$

All parameters except $\beta_n$, or alternately $\gamma_n$, are known either as physical descriptions of the grating geometry or the parameters of the incident plane wave or plane waves as the case may be. The details of incorporating the incident plane wave information with the grating modes is well known, and is not be discussed further herein. In contrast, $\beta_n$ or $\gamma_n$ is preferably computed from the following equation:

$$\cos(\beta_n a)\cos(\gamma_n(b-a)) - \quad 9$$
$$\frac{1}{2}\left(\frac{r_2}{r_1}\frac{\beta_n}{\gamma_n} + \frac{r_1}{r_2}\frac{\gamma_n}{\beta_n}\right)\sin(\beta_n a)\sin(\gamma_n(b-a)) = \cos(k_{yo}b)$$

In practice, the computation of $\beta_n$, or alternately $\gamma_n$, from equation 9 is the main obstacle to using the modal method. The reason is that equation 9 is a transcendental equation, meaning that it is impossible to write an explicit expression for $\beta_n$ or $\gamma_n$ without inclusion of functions containing $\beta_n$ or $\gamma_n$. $\beta_n$ or $\gamma_n$ must, therefore, be computed numerically using complex root finding algorithms. Although a variety of root finding algorithms exists, it is notoriously difficult to reliably compute complex roots for equation 9. In particular, it is difficult to verify whether a computed root is a true root rather than a false root whose error is less than computational precision, or whether roots are missing over a finite spectrum. Difficulties with the root finding process have been one of the primary reasons why the modal method is not commonly used in practice, despite the fact that it is, in principle, a more accurate and rigorous model than the rigorous coupled wave analysis method.

To address these problems, a new method of computing $\beta_n$, or alternately $\gamma_n$, is presented, which has been empirically found to be a highly reliable and robust method. This improved eigenvalue computation, in turn, dramatically improves the robustness and reliability of the modal method approach. The originality of this method is to rewrite equation 9 into a recursive equation to compute $\beta_n$ or $\gamma_n$ from previous estimates of $\beta_n$ or $\gamma_n$, i.e., $$\beta_n^{i+1} = F(\beta_n^i)$$

where $\beta_n^i$=the eigenvalue of the $i^{th}$ recursion and F is a function such that $\beta_n = F(\beta_n)$ is mathematically identical to the eigenvalue equation.

To illustrate the approach, one possible recursive relation for $\beta_n$ is first considered. Equation 9 is modified by $\cos(\beta_n a)$ and rearranging terms, as given below:

$$\tan(\beta_n a) = \quad 10$$
$$\frac{2}{\sin(\gamma_n(b-a))}\left(\frac{r_2}{r_1}\frac{\beta_n}{\gamma_n} + \frac{r_1}{r_2}\frac{\gamma_n}{\beta_n}\right)^{-1}\left[\frac{\cos(k_{yo}b)}{\cos(\beta_n a)} + \cos(\gamma_n(b-a))\right]$$

or, equivalently, $$\beta_n = \frac{1}{a}\text{ArcTan}\left(\frac{2}{\sin(\gamma_n(b-a))}\left(\frac{r_2}{r_1}\frac{\beta_n}{\gamma_n} + \frac{r_1}{r_2}\frac{\gamma_n}{\beta_n}\right)^{-1}\left[\frac{\cos(k_{yo}b)}{\cos(\beta_n a)} + \cos(\gamma_n(b-a))\right] + m\pi\right) \quad 11$$

where m=integer denoting the branch of the Arctangent function over which it is single-valued.

A main feature of the invention is that equation 11 is converted into a recursive equation, whereby $\beta_n$ is iteratively computed from a previous estimate of $\beta_n$, as given by:

$$\beta_n^{i+1} = \frac{1}{a}\text{ArcTan}\left(\frac{2}{\sin(\gamma_n^i(b-a))}\left(\frac{r_2}{r_1}\frac{\beta_n^i}{\gamma_n^i} + \frac{r_1}{r_2}\frac{\gamma_n^i}{\beta_n^i}\right)^{-1}\left[-\frac{\cos(k_{yo}b)}{\cos(\beta_n^i a)} + \cos(\gamma_n^i(b-a))\right] + m\pi\right) \quad 12$$

where the superscript i denotes the iteration number, and $\gamma_n$ is a function of $\beta_n$ given by equation 7.

As an illustration of the non-uniqueness of the recursive relationship, it is noted that a different recursive relationship for $\beta_n$ can also be derived by dividing equation 9 by $\sin(\beta_n a)$ instead of $\cos(\beta_n a)$, as given below:

$$\beta_n^{i+1} = \frac{1}{a}\text{ArcCot}\left(\frac{1}{\cos(\gamma_n^i(b-a))}\left[\frac{\cos(k_{yo}b)}{\sin(\beta_n^i a)} + \frac{1}{2}\left(\frac{r_2}{r_1}\frac{\beta_n^i}{\gamma_n^i} + \frac{r_1}{r_2}\frac{\gamma_n^i}{\beta_n^i}\right)\sin(\gamma_n^i(b-a))\right] + m\pi\right) \quad 13$$

Similarly, a recursive relationship for $\gamma_n$ rather than $\beta_n$ can be derived. Equation 9 is divided by $\cos(\gamma_n(b-a))$, as given below:

$$\gamma_n^{i+1} = \frac{1}{(b-a)}\text{ArcTan}\left(\frac{2}{\sin(\beta_n^i a)}\left(\frac{r_2}{r_1}\frac{\beta_n^i}{\gamma_n^i} + \frac{r_1}{r_2}\frac{\gamma_n^i}{\beta_n^i}\right)^{-1}\left[-\frac{\cos(k_{yo}b)}{\cos(\gamma_n^i(b-a))} + \cos(\beta_n^i a)\right] + m\pi\right) \quad 14$$

where $\beta_n$ is a function of $\gamma_n$ given by equation 7. As with $\beta_n$, the recursive relationships for $\gamma_n$ are not unique.

Practical Application

The practical use of the recursion equations 12 and 14 were empirically studied to compute the eigenvalues $\beta_n$ and $\gamma_n$ by comparing the results with those computed using the standard rigorous coupled wave analysis. In particular, the relative differences between the two approaches were studied for the first fifty of the lowest-order positive and negative Floquet harmonics (101 modes harmonics total) of a grating with the following material parameters: ($\varepsilon_1$, $\mu_1$) of silicon oxide, ($\varepsilon_2$, $\mu_2$) of copper, a=0.89 micron, b=1.432 micron.

The following items were determined in this analysis: (1) At least two explicit recursion relations, one for $\beta_n$ and one for $\gamma_n$, are needed to find all the eigenvalues over a finite range. (2) For the TM case, the recursion relations at each branch cut supplemented with root polishing based on the Newton-Raphson scheme compute all eigenvalues to more that four decimal places of accuracy over a finite spectrum, except for a second eigenvalues in the m=0 branch of equation 10. The second missing eigenvalues is close to the value of the first eigenvalues and can be computed using Newton-Raphson or other root finding algorithms.

(3) For the TE case, the recursion relations at each branch cut supplemented with root polishing based on the Newton-Raphson scheme compute more than eighty percent of the eigenvalues over a finite spectrum. The missing eigenvalues are readily identified and estimated by ordering the computed eigenvalues in terms of the real part of $\beta_n$. Ordering of more than eighty percent of the eigenvalues readily reveals the approximate intervals of the eigenvalues, the existence of missing eigenvalues, and the approximate value of the missing eigenvalues. The exact value of the eigenvalues is then computed from these approximate values using standard root-finding algorithms to a high degree of accuracy.

Results

The differences between the eigenvalues computed using the recursion relation equations 11 and 14 and the eigenvalues computed using the standard rigorous coupled wave analysis are quite small. The recursion relations are supplemented with Newton-Raphson root polishing as well as computation of missing TE, TM roots described above. The methods are in excellent agreement with one another, with less than one percent disagreement over eighty-five modes and less than ten percent disagreement over all one hundred and one modes. It is noted that the difference in the results is most likely due to the errors in the rigorous coupled wave analysis approximation, rather than the proposed invention. This is because the rigorous coupled wave analysis method itself is based on the solution of inherently approximate matrix equation representations of Maxwell's equations, whereas the recursion relations from which the eigenvalues are solved are inherently exact solutions to Maxwell's equations.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of determining actual properties of layered media, the method comprising the steps of:
   directing an incident beam of light towards the layered media, such that the incident beam of light is reflected from the layered media as a reflected beam of light,
   measuring actual properties of the reflected beam of light,
   estimating properties of the layered media, and
   solving a mathematical model of the layered media based on a modal function expansion with the estimated properties of the layered media to yield theoretical properties of the reflected beam of light, where eigenvalues of the modal function expansion are computed recursively by recasting an eigenvalue equation as:

$$\beta_n^{i+1} = F(\beta_n^i)$$

where $\beta_n^i$=an eigenvalue of an $i^{th}$ recursion, and F is a function such that $\beta_n = F(\beta_n)$ is mathematically identical to the eigenvalue equation.

2. The method of claim 1, wherein the method is implemented in an ellipsometer.

3. The method of claim 1, wherein the layered media comprises layers of more than one material.

4. The method of claim 1, wherein the layered media comprises more than one layer.

5. The method of claim 1, wherein the layered media includes a grating layer.

6. The method of claim 1, wherein the actual properties of the layered media include at least one of layer thickness and layer refractive index.

7. The method of claim 1, wherein the method is implemented in a scatterometer.

8. The method of claim 1, wherein the layered media comprises a film stack on a semiconducting substrate.

9. A method of determining a reflectance of a layered media by solving a mathematical model of the layered media based on a modal function expansion, where eigenvalues of the modal function expansion are computed recursively by recasting an eigenvalue equation as:

$$\beta_n^{i+1} = F(\beta_n^i)$$

where $\beta_n^i$=an eigenvalue of an $i^{th}$ recursion, and F is a function such that $\beta_n = F(\beta_n)$ is mathematically identical to the eigenvalue equation.

10. The method of claim 9, wherein the method is implemented in an ellipsometer.

11. The method of claim 9, wherein the method is implemented in a scatterometer.

12. A method of determining actual properties of layered media having more than one layer and layers of more than one material and including a grating layer on a semiconducting substrate, the method comprising the steps of:
   directing an incident beam of light towards the layered media, such that the incident beam of light is reflected from the layered media as a reflected beam of light,
   measuring actual properties of the reflected beam of light, including at least one of layer thickness and layer refractive index,
   estimating properties of the layered media, and
   solving a mathematical model of the layered media based on a modal function expansion with the estimated properties of the layered media to yield theoretical properties of the reflected beam of light, where eigenvalues of the modal function expansion are computed recursively by recasting an eigenvalue equation as:

$$\beta_n^{i+1} = F(\beta_n^i)$$

where $\beta_n^i$=an eigenvalue of an $i^{th}$ recursion, and F is a function such that $\beta_n = F(\beta_n)$ is mathematically identical to the eigenvalue equation.

13. The method of claim 12, wherein the method is implemented in an ellipsometer.

14. The method of claim 12, wherein the method is implemented in a scatterometer.

* * * * *